United States Patent
Kodato et al.

(10) Patent No.: US 9,457,836 B2
(45) Date of Patent: Oct. 4, 2016

(54) POWER STEERING APPARATUS

(71) Applicant: HITACHI AUTOMOTIVE SYSTEMS STEERING, LTD., Hiki-gun, Saitama (JP)

(72) Inventors: Masaki Kodato, Sagamihara (JP); Kazuya Yamano, Yamato (JP)

(73) Assignee: HITACHI AUTOMOTIVE SYSTEMS STEERING, LTD., Hiki-Gun (JP)

( * ) Notice: Subject to any disclaimer, the term of this patent is extended or adjusted under 35 U.S.C. 154(b) by 1 day.

(21) Appl. No.: 14/492,654

(22) Filed: Sep. 22, 2014

(65) Prior Publication Data

US 2015/0088383 A1  Mar. 26, 2015

(30) Foreign Application Priority Data

Sep. 24, 2013 (JP) .................................. 2013-196956

(51) Int. Cl.
  *B62D 5/04* (2006.01)
  *B62D 6/00* (2006.01)

(52) U.S. Cl.
  CPC ............. *B62D 5/0463* (2013.01); *B62D 6/007* (2013.01)

(58) Field of Classification Search
  CPC .............................. B62D 5/0463; B62D 6/007
  USPC ........................................................ 701/41
  See application file for complete search history.

(56) References Cited

U.S. PATENT DOCUMENTS

| 5,743,351 | A | * | 4/1998 | McLaughlin | ........... H02P 25/08 180/446 |
| 6,122,579 | A | * | 9/2000 | Collier-Hallman | .. B62D 5/0472 180/234 |
| 2001/0016793 | A1 | * | 8/2001 | Ikemoto | ............... B62D 5/0472 701/41 |
| 2011/0048840 | A1 | * | 3/2011 | Gagnon | ............... B62D 5/0463 180/446 |

FOREIGN PATENT DOCUMENTS

JP    11-029056 A    2/1999

* cited by examiner

*Primary Examiner* — Brian P Sweeney
(74) *Attorney, Agent, or Firm* — Foley & Lardner LLP

(57) ABSTRACT

A power steering apparatus has a first characteristic which is a characteristic of a command signal with respect to steering torque and a second characteristic which is a characteristic different from the first characteristic. When switching is to be made to a characteristic selected from between the first and second characteristics, an interpolation characteristic intermediate between the first and second characteristics is calculated so that the characteristic used before switching of the characteristics gradually approaches the characteristic to be used after the switching, and a characteristic switching time for switching between the first and second characteristics is variably controlled in accordance with the steering torque.

15 Claims, 5 Drawing Sheets

POWER STEERING APPARATUS

BACKGROUND OF THE INVENTION

The present invention relates to power steering apparatus.

A technique relating to power steering apparatus is disclosed in Japanese Patent Application Publication No. H11-29056 (Patent Document 1). Patent Document 1 discloses an electric motor-driven power steering apparatus having a plurality of assist characteristics, in which, in order to smoothly switch from one assist characteristic to another without giving a sense of incongruity to the driver during switching, a characteristic used before switching of the characteristics and a characteristic to be used after the switching are simultaneously calculated and processed by using a transition coefficient, thereby attaining smooth switching between the assist characteristics.

[Patent Document 1] JP H11-29056

With the technique disclosed in the above-described Patent Document 1, however, when the driver switches from an assist characteristic providing a large assist quantity to an assist characteristic providing a small assist quantity during turning the steering wheel, he or she may feel a sense of incongruity due to a lack of assist quantity. Conversely, when the driver switches from an assist characteristic providing a small assist quantity to an assist characteristic providing a large assist quantity during returning the steering wheel, he or she may feel a sense of incongruity due to an excess of assist quantity.

The present invention has been made in view of the above-described problem.

Accordingly, an object of the present invention is to provide a power steering apparatus capable of switching between assist characteristics without giving a sense of incongruity to a driver.

SUMMARY OF THE INVENTION

To attain the above-described object, the present invention provides a power steering apparatus in which, when a first characteristic which is a characteristic of a command signal with respect to steering torque and a second characteristic which is a characteristic different from the first characteristic are to be switched from one to another, an interpolation characteristic intermediate between the first and second characteristics is calculated so that one of the first and second characteristics that is used before switching of the characteristics gradually approaches another of the first and second characteristics that is to be used after the switching, and a characteristic switching time for switching between the first and second characteristics is variably controlled in accordance with the steering torque.

DETAILED DESCRIPTION OF THE PREFERRED EMBODIMENTS

First Embodiment

Structure of Power Steering Apparatus

Figure 1:
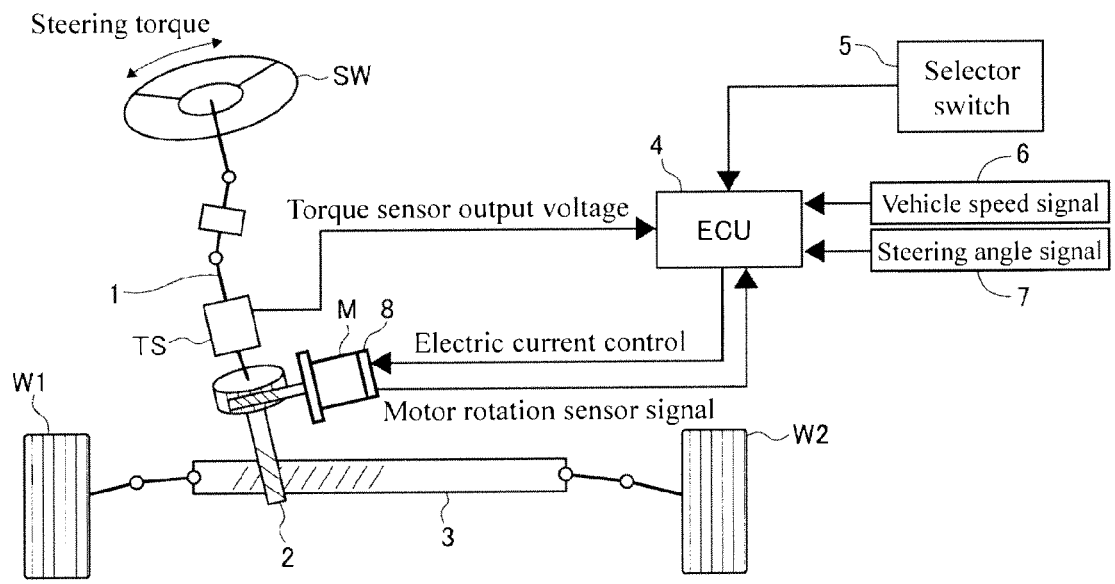
FIG. 1 is a system block diagram showing an overall system configuration of a power steering apparatus according to a first embodiment of the present invention.

FIG. 1 is a system block diagram showing an overall system configuration of a power steering apparatus according to a first embodiment of the present invention. The power steering apparatus has a steering shaft 1 connected to a steering wheel SW, a torque sensor TS provided on the steering shaft 1 to detect steering torque that the driver applies to the steering wheel SW, an assist motor M applying assist torque to a pinion shaft 2 rotating together with the steering shaft 1 as one unit, a rack bar 3 meshed with the pinion shaft 2, and steered wheels W1 and W2 steered through respective tie rods connected to the rack bar 3. In the passenger compartment of the vehicle is provided a selector switch 5 which allows the driver to select among assist characteristics for assisting the steering torque by the power steering apparatus.

A power steering controller 4 calculates a target assist torque based on steering torque detected by the torque sensor TS, a characteristic signal selected with the selector switch 5, a vehicle speed signal detected by a vehicle speed sensor 6, and a steering angle signal detected by a steering angle sensor 7, and performs electric current control for the assist motor M on the basis of the target assist torque, together with a motor rotation sensor signal detected by a motor rotation sensor 8 provided at the assist motor M. When the driver steers the steering wheel SW, assist torque of the assist motor M is applied to the pinion shaft 2, in addition to the steering torque applied by the driver, thereby steering the steered wheels W1 and W2 through a rack-and-pinion type steering mechanism that converts rotary motion of the pinion shaft 2 into axial motion of the rack bar 3.

Figure 2:
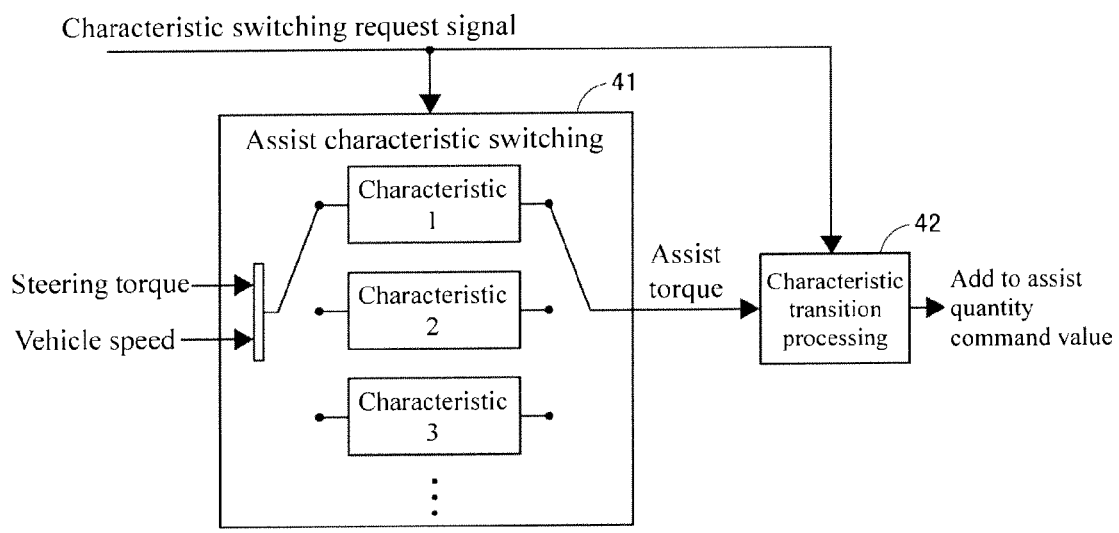
FIG. 2 is a control block diagram showing control processing in a power steering controller of the first embodiment.

FIG. 2 is a control block diagram showing control processing in the power steering controller 4 of the first embodiment. The power steering controller 4 has therein an assist characteristic switching unit 41 switching assist characteristics from one to another, and a characteristic transition processing unit 42 performing characteristic transition processing on the assist torque output from the assist characteristic switching unit 41. The assist characteristic switching unit 41 and the characteristic transition processing unit 42 control an operating condition based on a characteristic switching request signal output from the selector switch 5. The characteristic transition processing unit 42 incorporates a command signal calculation circuit that outputs to the assist motor M a command signal obtained by performing correction on the assist torque based on the selected characteristic to realize a smooth transition during switching between the assist characteristics.

The assist characteristic switching unit 41 incorporates a steering characteristic storage circuit configured to store or storing a plurality of assist characteristics and further incorporates a steering characteristic switching control circuit switching between the assist characteristics based on the characteristic switching request signal. The assist characteristic switching unit 41 determines assist torque based on the assist characteristic to which switching has been made by the steering characteristic switching control circuit, together with the steering torque detected by the torque sensor TS, and the vehicle speed detected by the vehicle speed sensor 6. It should be noted that, for the vehicle speed, there has been provided a vehicle speed gain (from 0 to 1) set so that the assist quantity decreases as the vehicle speed increases. When assist torque for the steering torque is calculated based on the selected characteristic, the calculated assist torque is multiplied by the vehicle speed gain to output final assist torque. It should also be noted that the method in which the calculated assist torque is multiplied by the vehicle speed gain may be replaced by a method in which a plurality of assist characteristic maps prepared for each assist characteristic are referenced sequentially.

Figure 3:
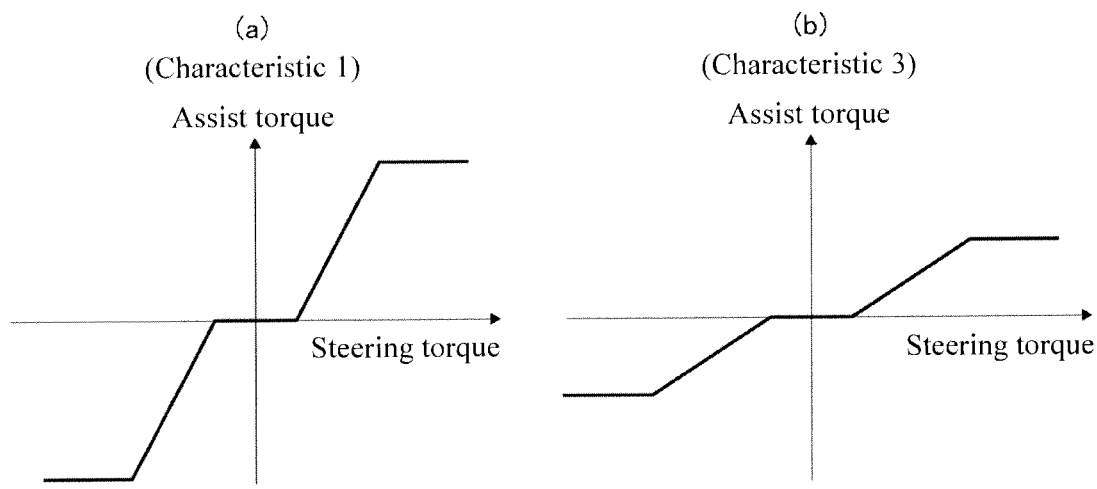
FIG. 3 is a schematic diagram showing assist characteristics in the first embodiment.

FIG. 3 is a schematic diagram showing assist characteristics. FIG. 3, part (a) illustrates a characteristic 1 in which the increasing gradient of the assist torque with respect to the steering torque is large. On the selector switch 5, the characteristic 1 is set as "comfort mode" in which the steering load is very small. FIG. 3, part (b) illustrates a characteristic 3 in which the increasing gradient of the assist torque with respect to the steering torque is small. On the selector switch 5, the characteristic 3 is set as "sports mode" in which the steering load is large. It will be understood from FIG. 3 that the assist torque is changed by switching the selector switch 5 even at the same steering torque. It should be noted that a characteristic 2 is set as "normal mode", for example, in which the steering load is moderate. However, the characteristic 2 is not limited to "normal mode" but may be other characteristics.

Figure 4:
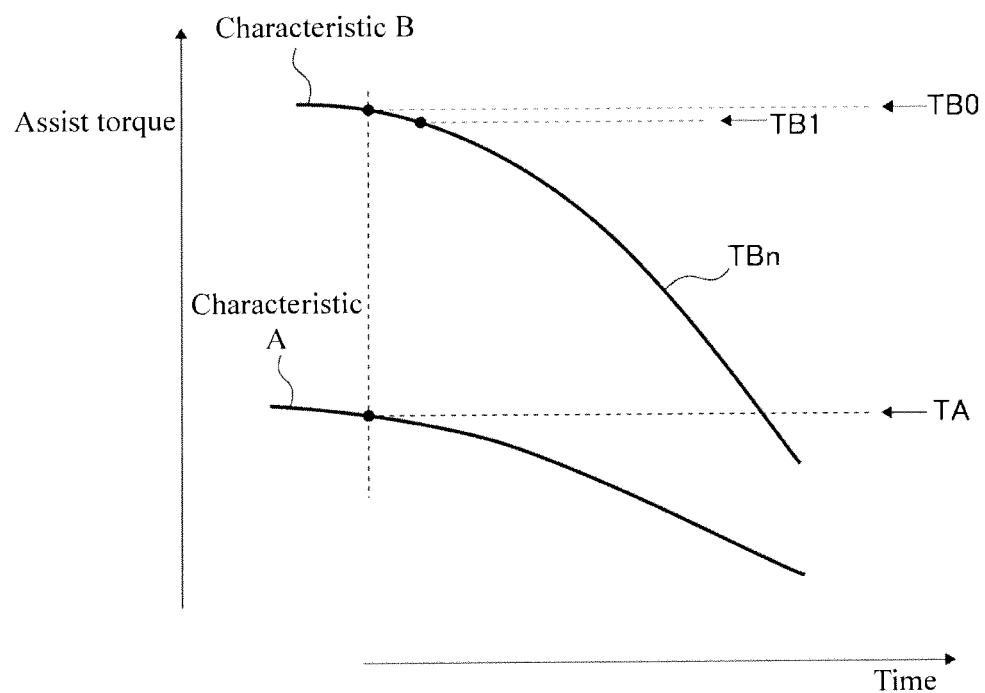
FIG. 4 is a schematic diagram showing a definition of parameters used in a characteristic transition processing unit of the first embodiment.

The following is an explanation of the structure of the characteristic transition processing unit 42. FIG. 4 is a schematic diagram showing the definition of parameters used in the characteristic transition processing unit 42 of the first embodiment. Here, when a characteristic switching request signal is output from the selector switch 5, a characteristic used before switching is referred to as a "characteristic A" and a characteristic to be used after switching is referred to as a "characteristic B". FIG. 4 shows an example in which the characteristic B includes a set of large values of assist torque and the characteristic A includes a set of small values of assist torque; however, the magnitude relation may be reversed. In addition, the values of the characteristics A and B when the characteristic switching request signal is output are defined as a "holding value TA" and an "initial value TB0", respectively. The value of the characteristic B in a control cycle subsequent to a control cycle in which the characteristic switching request signal has been recognized is defined as a "present value TB1", and the value of the characteristic B varying from moment to moment in the following control cycles is defined as a "characteristic B value TBn".

Figure 5:
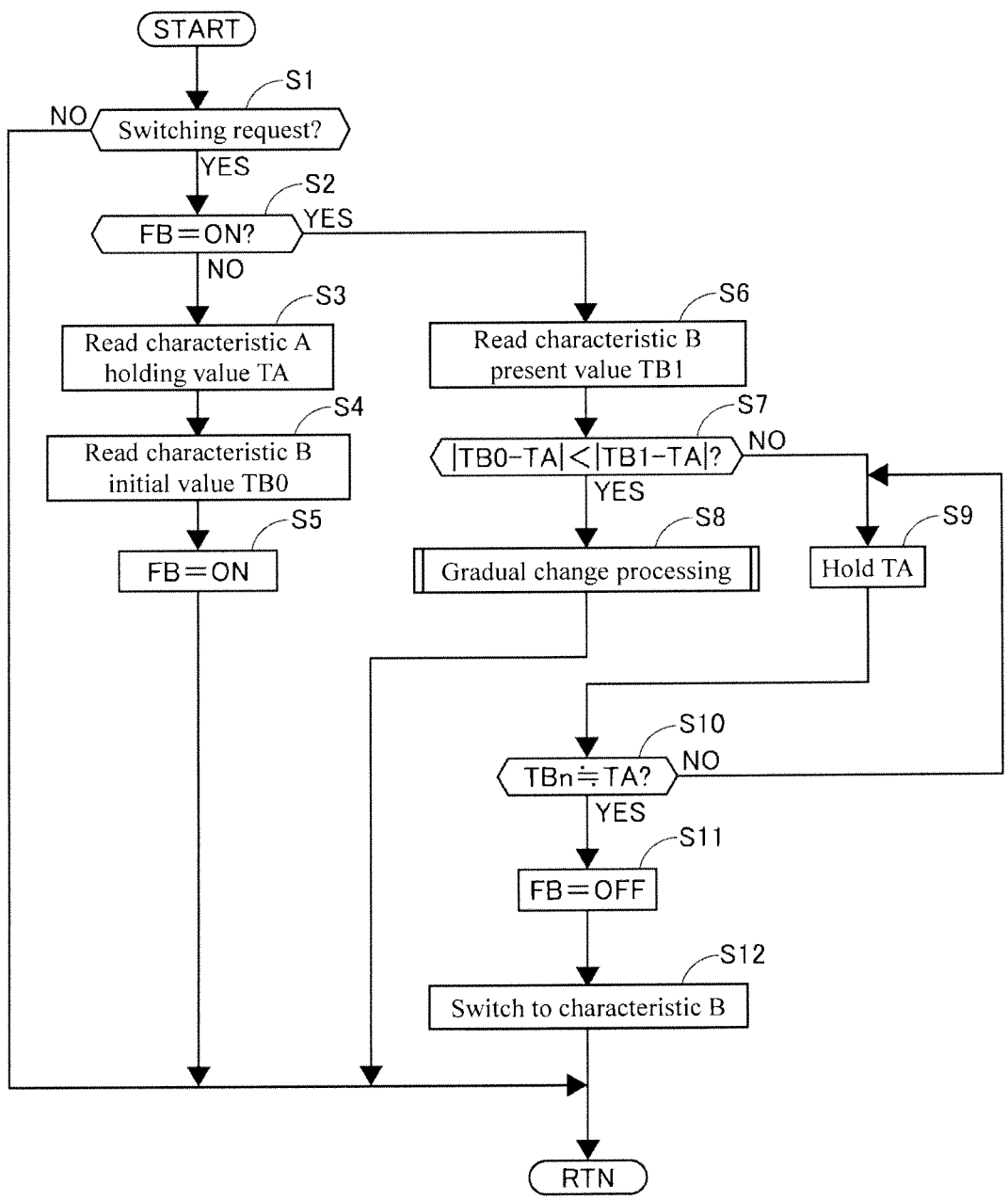
FIG. 5 is a flowchart showing characteristic transition processing in the first embodiment.

FIG. 5 is a flowchart showing the characteristic transition processing in the first embodiment. At step S1, it is judged whether or not a characteristic switching request signal has been output from the selector switch 5. If YES, the process proceeds to step S2; otherwise, the present control flow is ended. At step S2, it is judged whether or not a switching flag FB is on. If YES, the process proceeds to step S6. If the switching flag FB is off, the process proceeds to step S3. At step S3, the holding value TA of the characteristic A is read. At step S4, the initial value TB0 of the characteristic B is read. At step S5, the switching flag FB is set to on.

At step S6, the present value TB1 of the characteristic B is read. At step S7, it is judged whether or not |TB0−TA|<|TB1−TA|, i.e. whether or not the difference between the holding value TA and the characteristic B is on an increasing trend. If the difference is increasing, the process proceeds to step S8, whereas, if the difference is on a decreasing trend, the process proceeds to step S9. At step S8, gradual change processing is executed. In the gradual change processing, the characteristic A is switched to the characteristic B, and assist torque to be used as a reference is calculated based on the characteristic B. In addition, a correction value that decreases at a predetermined gradient from the initial difference (TB0−TA) as an initial value is added to or subtracted from the characteristic B. If the characteristic B to be used after switching outputs larger assist torque than the characteristic A used before switching, the correction value is subtracted from the characteristic B. If the characteristic B to be used after switching outputs smaller assist torque than the characteristic A used before switching, the correction value is added to the characteristic B. Thus, the assist characteristic switching unit 41 performs only calculation based on the characteristic B, and the characteristic transition processing unit 42 adds the correction value, thereby allowing the characteristics to be gradually switched from one to another without performing calculation for the characteristic A. It should be noted that, if the process proceeds to step S8, it means that the increasing/decreasing direction of the steering torque and the direction of change of the corrected quantity resulting from switching of the characteristics coincide with each other. Accordingly, the assist characteristics can be switched from one to another without giving a sense of incongruity to the driver.

At step S9, the holding value TA is held as assist torque. At step S10, it is judged whether or not the characteristic B value TBn has substantially coincided with the holding value TA. If YES, the process proceeds to step S11; otherwise, the process returns to step S9 to continue to hold the value TA as assist torque. At step S11, the switching flag FB is set to off. At step S12, the characteristic A is switched to the characteristic B.

Figure 6:
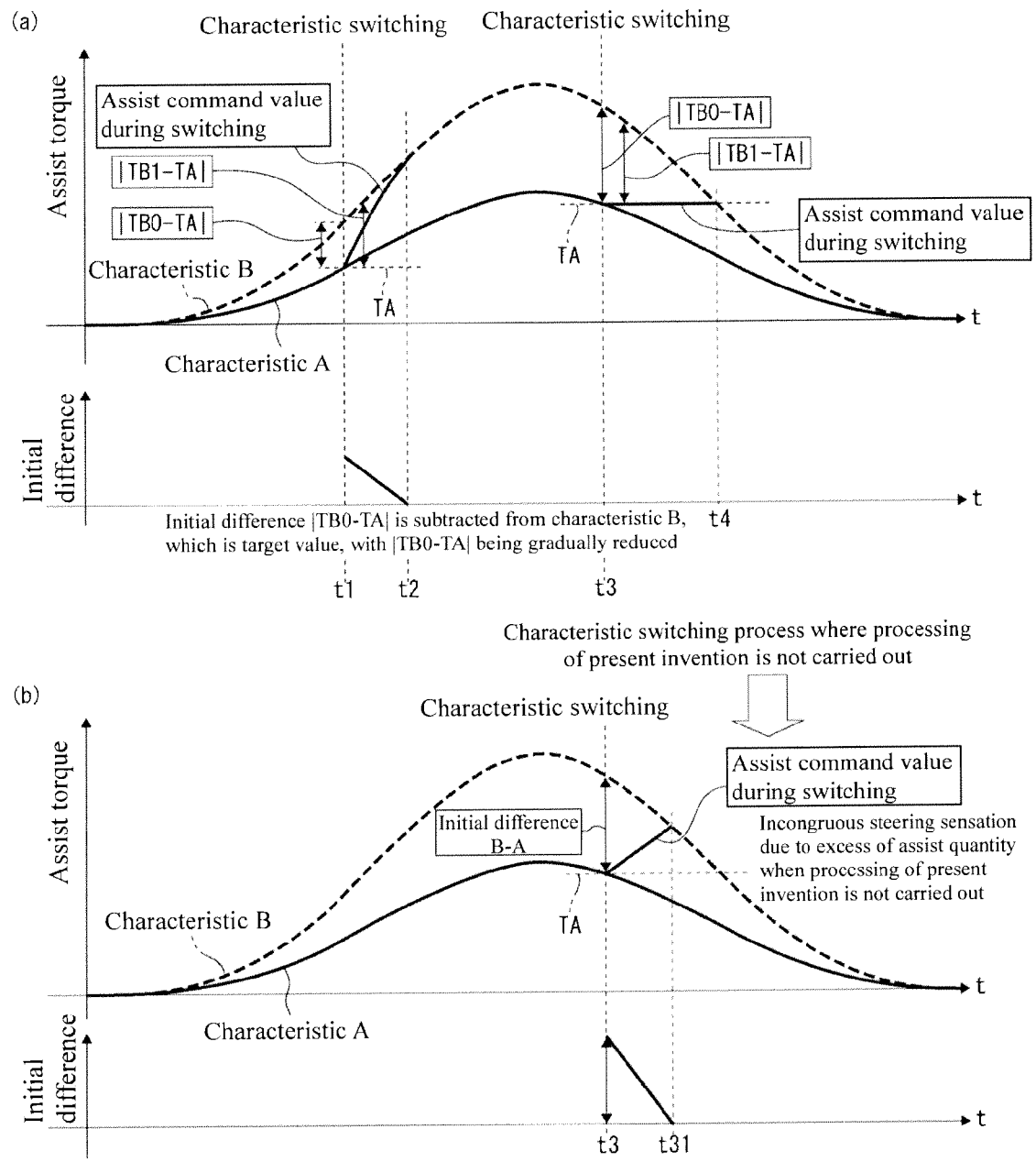
FIG. 6 is a time chart showing switching from a characteristic A to a characteristic B in the first embodiment.

The following is an explanation of the operation of the above-described characteristic transition processing. FIG. 6 is a time chart showing the operation of the characteristic transition processing when the characteristic A is to be switched to the characteristic B. In the illustrated time chart, the characteristic A is a sports mode in which the assist torque is small, and the characteristic B is a comfort mode in which the assist torque is large. In the following, the operation of the characteristic transition processing will be explained for two situations in which the steering wheel SW is in a turning state and in a returning state, respectively, when the characteristic A is to be switched to the characteristic B.

(Characteristic Switching During Turning the Steering Wheel SW)

At time t1, a switching request for switching from the characteristic A to the characteristic B is made when the driver is turning the steering wheel SW. At this time, the characteristic transition processing unit 42 reads a holding value TA and an initial value TB0, which are values of the characteristics A and B, respectively, when the characteristic switching request is made, and further reads a present value TB1, which is a value of the characteristic B at the subsequent step. Because the steering wheel SW is being turned and the assist torque is on an increasing trend, a gradual increase in assist torque associated with the switching of the characteristics gives no sense of incongruity to the driver. Accordingly, the characteristic transition processing unit 42 starts subtraction of the initial difference |TB0−TA| from the value of the characteristic B, which is a target value, while gradually reducing the initial difference |TB0−TA| over a predetermined time. When the initial difference becomes substantially zero at time t2, the switching to the characteristic B is completed. Thus, it is possible to perform smooth assist characteristic switching while minimizing the calculation load.

(Characteristic Switching During Returning the Steering Wheel SW)

At time t3, a switching request for switching from the characteristic A to the characteristic B is made when the driver is returning the steering wheel SW. At this time, if the initial difference when the characteristic switching request is made is gradually reduced over a predetermined time, as shown in part (b) of FIG. 6, the assist torque that has been on a decreasing trend in the steering wheel returning state is undesirably reversed to be on an increasing trend, which will give a sense of incongruity to the driver, as if there were a sudden loss of steering load. Therefore, in this case, the assist torque is held at the holding value TA, and the characteristic A is switched to the characteristic B after the characteristic B value TBn has substantially coincided with the holding value TA. Thus, the increasing/decreasing direction of the assist torque when the switching request is made and the increasing/decreasing direction of the assist torque resulting from the characteristic switching can be made coincident with each other, and it is possible to avoid giving a sense of incongruity to the driver, which would otherwise occur due to the disagreement on the increasing/decreasing direction.

Figure 7:
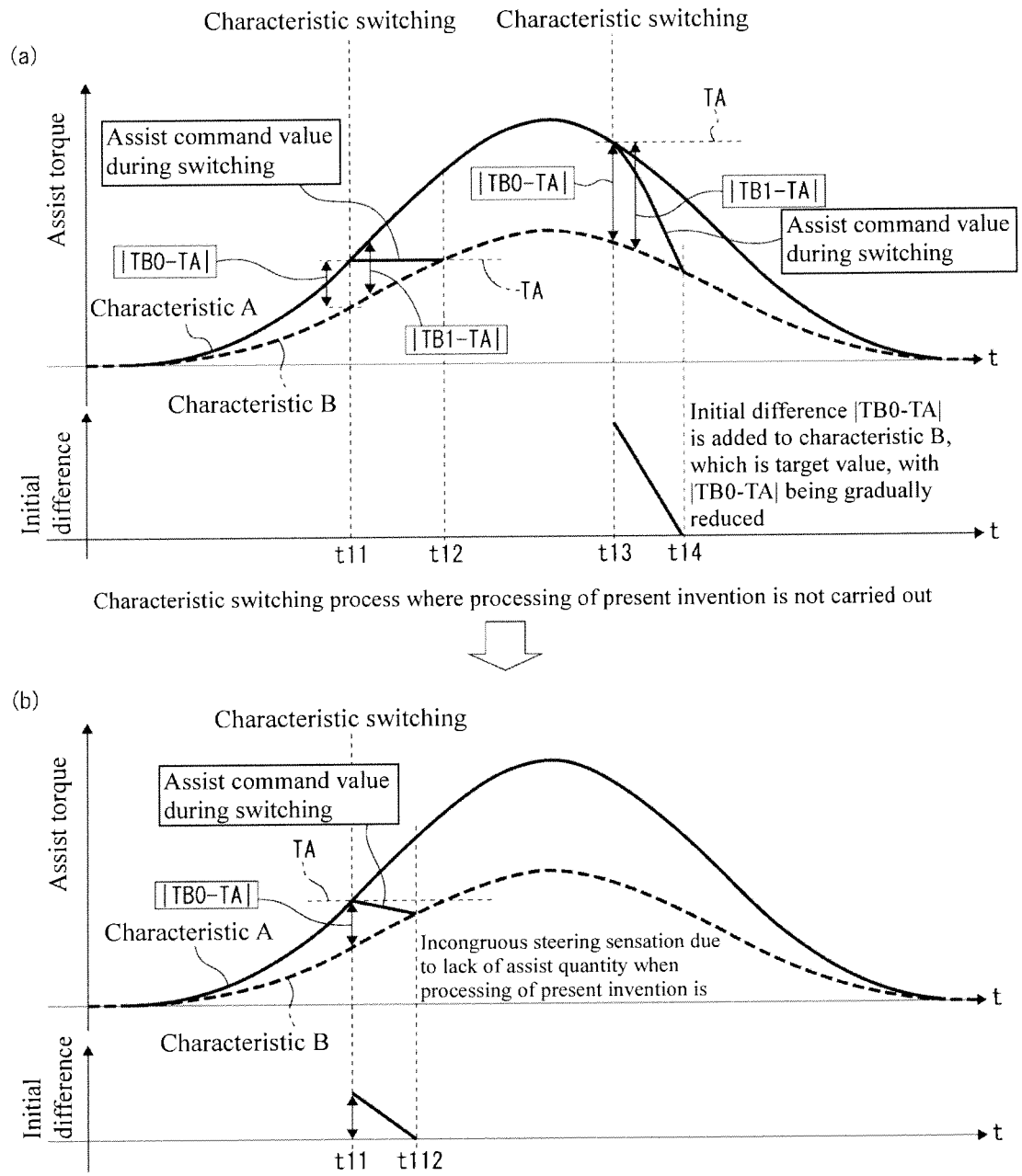
FIG. 7 is a time chart showing switching from a characteristic A to a characteristic B in the first embodiment.

FIG. 7 is a time chart showing the operation of the characteristic transition processing when the characteristic A is to be switched to the characteristic B. In the illustrated time chart, the characteristic A is a comfort mode in which the assist torque is large, and the characteristic B is a sports mode in which the assist torque is small. In the following, the operation of the characteristic transition processing will be explained for two situations in which the steering wheel SW is in a turning state and in a returning state, respectively, when the characteristic A is to be switched to the characteristic B, in the same way as in FIG. 6.

(Characteristic Switching During Turning the Steering Wheel SW)

At time t11, a switching request for switching from the characteristic A to the characteristic B is made when the driver is turning the steering wheel SW. At this time, the characteristic transition processing unit 42 reads a holding value TA and an initial value TB0, which are the values of the characteristic A and the characteristic B, respectively, when the characteristic switching request is made, and further reads a present value TB1, which is the value of the characteristic B at the subsequent step. Because the steering wheel SW is being turned, the assist torque is on an increasing trend. If, in this state, the initial difference is gradually reduced over a predetermined time, as shown in part (b) of FIG. 7, the assist torque that has been on an increasing trend is undesirably reversed to be on a decreasing trend despite the steering wheel turning state, which will give a sense of incongruity to the driver, as if there were an increase in the steering load (i.e. the driver feels as if the steering wheel were forced back). Therefore, in this case, the assist torque is held at the holding value TA, and the characteristic A is switched to the characteristic B after the characteristic B value TBn has substantially coincided with the holding value TA. Thus, the increasing/decreasing direction of the assist torque when the switching request is made and the increasing/decreasing direction of the assist torque resulting from the characteristic switching can be made coincident with each other, and it is possible to avoid giving a sense of incongruity to the driver, which would otherwise occur due to the disagreement on the increasing/decreasing direction.

(Characteristic Switching During Returning the Steering Wheel SW)

At time t13, a switching request for switching from the characteristic A to the characteristic B is made when the driver is returning the steering wheel SW. At this time, the steering wheel SW is being returned, and the assist torque is on a decreasing trend. Therefore, a gradual decrease in assist torque associated with the switching of the characteristics gives no sense of incongruity to the driver. Accordingly, the characteristic transition processing unit 42 starts addition of the initial difference |TB0−TA| to the value of the characteristic B, which is a target value, while gradually reducing the initial difference |TB0−TA| over a predetermined time. When the initial difference becomes substantially zero at time t14, the switching to the characteristic B is completed. Thus, it is possible to perform smooth assist characteristic switching while minimizing the calculation load.

The operation of the characteristic transition processing has been explained above focusing on the change in assist torque associated with the change in operating state of the steering wheel SW, i.e. turning and returning of the steering wheel. However, the same advantages as the above can also be obtained for the change in assist torque associated with the change in vehicle speed. For example, the assist torque is also changed when the vehicle speed is changed with the steering torque kept constant because, as the vehicle speed becomes higher, the vehicle speed gain assumes a value closer to 0, whereas, as the vehicle speed becomes lower, the vehicle speed gain becomes closer to 1. Accordingly, the assist torque is on an increasing trend during deceleration, for example, and during acceleration, the assist torque is on a decreasing trend. Thus, assist characteristic switching similar to the above can also be attained when the selector switch 5 is actuated while the vehicle speed is changing.

Advantages of the First Embodiment

Let us list below the advantages of the first embodiment.
(1) A power steering apparatus has: a rack-and-pinion mechanism (hereinafter referred to as a "steering mechanism") transmitting a steering operation of a steering wheel SW to a steered wheel; an assist motor M (an electric motor) applying steering force to the steering mechanism; a torque sensor TS provided in the steering mechanism to detect steering torque of the steering mechanism; a power steering controller 4 (a control unit) outputting a command signal to the assist motor M in accordance with the steering torque; an assist characteristic switching unit 41 (a steering characteristic storage circuit) provided in the power steering controller 4 to store a first characteristic (comfort mode) which is a characteristic of the command signal with respect to the steering torque, and a second characteristic (sports mode) which is a characteristic different from the first characteristic; an assist characteristic switching unit 41 (a steering characteristic switching control circuit) provided in the power steering controller 4 to switch to a characteristic selected from between the first characteristic and the second characteristic; steps S6 and S7 (hereinafter referred to as an "interpolation characteristic calculation unit") provided in a characteristic transition processing unit 42 to calculate, when switching between the first characteristic and the second characteristic is to be performed, an interpolation characteristic intermediate between the first characteristic and the second characteristic so that one of the first and second characteristics that is used before switching gradually approaches another of the first and second characteristics that is to be used after switching; steps S8 and S9 (hereinafter referred to as a "switching adjusting unit") provided in the characteristic transition processing unit 42 to variably control a characteristic switching time for switching between the first characteristic and the second characteristic in accordance with the steering torque; and a command signal calculation circuit provided in the power steering controller 4 to calculate the command signal on the basis of the characteristic to which switching has been made by the assist characteristic switching unit 41. Accordingly, the characteristic switching time is adjusted in accordance with the steering torque, which reflects a state of steering by the driver and a vehicle running state. Thus, it is possible to suppress the driver from feeling an incongruous steering sensation during switching of the characteristics. It should be noted that the number of characteristics is not limited to two but may be three or more.

(2) In the power steering apparatus as set forth in (1), the first characteristic (comfort mode) is set larger than the second characteristic (sports mode) in terms of the value of the command signal with respect to the steering torque, and when the assist characteristic switching unit 41 switches from the first characteristic to the second characteristic while the steering torque is decreasing, the switching adjusting unit sets the characteristic switching time longer than when the steering torque is kept constant ("when the steering torque is kept constant" corresponds to the periods other than "when the steering torque is decreasing" and "when the steering torque is increasing"). Accordingly, it is possible to suppress such an incongruous steering sensation that the steering load on the driver increases suddenly or the steering load will not decrease easily despite the fact that the steering torque is decreasing. It should be noted that, although the first embodiment shows an example in which the assist torque is held at a holding value, the present invention also includes an arrangement in which the steering load increases in the above-described situation, provided that the extent to which the steering load increases is suppressed.

(3) In the power steering apparatus as set forth in (2), when the assist characteristic switching unit 41 switches from the first characteristic to the second characteristic while the steering torque is decreasing, the interpolation characteristic calculation unit calculates the interpolation characteristic so that the steering torque will not increase during a time period from start to completion of switching of the characteristics. Accordingly, it is possible to improve such an incongruous steering sensation that the steering torque increases owing to the switching of the characteristics despite the fact that the driver is performing a steering operation in which the steering torque decreases.

(4) In the power steering apparatus as set forth in (3), when the assist characteristic switching unit 41 switches from the first characteristic to the second characteristic while the steering torque is decreasing, the interpolation characteristic calculation unit calculates the interpolation characteristic on the basis of the steering torque and the characteristic to be used after switching. Accordingly, the interpolation characteristic is calculated based not on the characteristic used before switching and the characteristic to be used after switching but on the steering torque and the characteristic to be used after switching. More specifically, the interpolation characteristic is calculated in accordance with the difference between the steering torque and the characteristic to be used after switching, which are subjected to calculation after being converted into the same unit. When the characteristic used before switching is used for calculation of the interpolation characteristic, it is necessary to calculate the characteristic used before switching in accordance with the steering torque. However, the use of the steering torque in place of the characteristic used before switching makes it possible to simplify the calculation of the interpolation characteristic.

(5) In the power steering apparatus as set forth in (1), the first characteristic (comfort mode) is set larger than the second characteristic (sports mode) in terms of the value of the command signal with respect to the steering torque, and when the assist characteristic switching unit 41 switches from the second characteristic to the first characteristic while the steering torque is decreasing, the switching adjusting unit sets the characteristic switching time longer than when the steering torque is kept constant. Accordingly, it is possible to suppress a sudden reduction in steering torque due to an increase in assist torque associated with the switching of the characteristics when the steering torque is decreasing, which would otherwise make the driver feel as if there were a sudden loss of steering load.

(6) In the power steering apparatus as set forth in (5), when the assist characteristic switching unit 41 switches from the second characteristic to the first characteristic while the steering torque is decreasing, the interpolation characteristic calculation unit calculates the interpolation characteristic so that the command signal will not increase during a time period from start to completion of switching of the characteristics. Accordingly, even when the steering characteristic is switched from the second characteristic to the first characteristic, the assist torque of the assist motor M is not increased when the steering torque is decreasing. Thus, it is possible to suppress a feeling as if there were a sudden loss of steering load.

(7) In the power steering apparatus as set forth in (6), when the assist characteristic switching unit 41 switches from the second characteristic to the first characteristic while the steering torque is decreasing, the interpolation characteristic calculation unit calculates the interpolation characteristic on the basis of the steering torque and the characteristic to be used after switching. Accordingly, the interpolation characteristic is calculated based not on the characteristic used before switching and the characteristic to be used after switching but on the steering torque and the characteristic to be used after switching. More specifically, the interpolation characteristic is calculated in accordance with the difference between the steering torque and the characteristic to be used after switching, which are subjected to calculation after being converted into the same unit. When the characteristic used before switching is used for calculation of the interpolation characteristic, it is necessary to calculate the characteristic used before switching in accordance with the steering torque. However, the use of the steering torque in place of the characteristic used before switching makes it possible to simplify the calculation of the interpolation characteristic.

(8) In the power steering apparatus as set forth in (1), the first characteristic is set larger than the second characteristic in terms of the value of the command signal with respect to the steering torque, and when the assist characteristic switching unit 41 switches from the second characteristic to the first characteristic while the steering torque is increasing, the switching adjusting unit sets the characteristic switching time longer than when the steering torque is kept constant. Accordingly, it is possible to suppress such an incongruous steering sensation that the steering load on the driver decreases suddenly or the steering load will not increase easily despite the fact that the steering torque is increasing.

(9) In the power steering apparatus as set forth in (8), when the assist characteristic switching unit 41 switches from the second characteristic to the first characteristic while the steering torque is increasing, the interpolation characteristic calculation unit calculates the interpolation characteristic so that the steering torque will not decrease during a time period from start to completion of switching of the characteristics. Accordingly, it is possible to improve such an incongruous steering sensation that the steering torque decreases owing to the switching of the characteristics despite the fact that the driver is performing a steering operation in which the steering torque increases.

(10) In the power steering apparatus as set forth in (9), when the assist characteristic switching unit 41 switches from the second characteristic to the first characteristic while the steering torque is increasing, the interpolation characteristic calculation unit calculates the interpolation characteristic on the basis of the steering torque and the characteristic to be used after switching. Accordingly, the interpolation characteristic is calculated based not on the characteristic used before switching and the characteristic to be used after switching but on the steering torque and the characteristic to be used after switching. More specifically, the interpolation characteristic is calculated in accordance with the difference between the steering torque and the characteristic to be used after switching, which are subjected to calculation after being converted into the same unit. When the characteristic used before switching is used for calculation of the interpolation characteristic, it is necessary to calculate the characteristic used before switching in accordance with the steering torque. However, the use of the steering torque in place of the characteristic used before switching makes it possible to simplify the calculation of the interpolation characteristic.

(11) In the power steering apparatus as set forth in (1), the first characteristic is set larger than the second characteristic in terms of the value of the command signal with respect to the steering torque, and when the assist characteristic switching unit 41 switches from the first characteristic to the second characteristic while the steering torque is increasing, the switching adjusting unit sets the characteristic switching time longer than when the steering torque is kept constant. Accordingly, it is possible to suppress a sudden increase in steering torque due to a decrease in assist torque associated with the switching of the characteristics when the steering torque is increasing, which would otherwise make the driver feel as if the steering wheel were forced back. It should be noted that, although the first embodiment shows an example in which the assist torque is held at a holding value, the present invention also includes an arrangement in which the steering load increases in the above-described situation, provided that the extent to which the steering load increases is suppressed.

(12) In the power steering apparatus as set forth in (11), when the assist characteristic switching unit 41 switches from the first characteristic to the second characteristic while the steering torque is increasing, the interpolation characteristic calculation unit calculates the interpolation characteristic so that the command signal will not decrease during a time period from start to completion of switching of the characteristics. Accordingly, the assist torque of the electric motor is not decreased when the steering torque is increasing even when the steering characteristic is switched from the first characteristic to the second characteristic. Thus, it is possible to suppress the driver from feeling as if the steering wheel were forced back.

(13) In the power steering apparatus as set forth in (12), when the assist characteristic switching unit 41 switches from the first characteristic to the second characteristic while the steering torque is increasing, the interpolation characteristic calculation unit calculates the interpolation characteristic on the basis of the steering torque and the characteristic to be used after switching. Accordingly, the interpolation characteristic is calculated based not on the characteristic used before switching and the characteristic to be used after switching but on the steering torque and the characteristic to be used after switching. More specifically, the interpolation characteristic is calculated in accordance with the difference between the steering torque and the characteristic to be used after switching, which are subjected to calculation after being converted into the same unit. When the characteristic used before switching is used for calculation of the interpolation characteristic, it is necessary to calculate the characteristic used before switching in accordance with the steering torque. However, the use of the steering torque in place of the characteristic used before switching makes it possible to simplify the calculation of the interpolation characteristic.

(14) In the power steering apparatus as set forth in (1), the switching adjusting unit adjusts the characteristic switching time to be longer as the steering torque increases. Accordingly, because the difference between the assist characteristics becomes larger as the steering torque increases, adjusting the characteristic switching time to be longer makes it possible to suppress an incongruous steering sensation due to a steering torque variation associated with a change of the characteristics. In the first embodiment, the holding configuration (the configuration that reads the holding value TA corresponding to the value of the current assist characteristic A when a characteristic switching request signal is output, and that calculates the initial difference |TB0−TA| between the holding value TA and the initial value TB0 corresponding to the value of the destination assist characteristic B when the characteristic switching request signal is output) allows the characteristic switching time to automatically become longer as the steering torque increases. However, the adjustment of the characteristic switching time may be attained by adjusting the time itself when the switching of the characteristics is performed by time control or other control process.

(15) In the power steering apparatus as set forth in (1), the switching adjusting unit sets the characteristic switching time shorter when the steering torque is less than a predetermined value than when the steering torque is not less than the predetermined value. Accordingly, when the steering torque is substantially zero, the change in steering torque associated with the switching of the characteristics is also small; therefore, switching responsiveness can be improved by shortening the characteristic switching time. For example, when the driver manually switches the characteristics from one to another, it is possible to speedily respond to the driver's intention of switching the characteristics. Although the above-described first embodiment shows an example in which switching of the characteristics is performed by using a switch, the present invention is not limited thereto. The vehicle may be configured to automatically switch the characteristics.

(16) A power steering apparatus has: a steering mechanism transmitting a steering operation of a steering wheel to a steered wheel; an assist motor M applying steering force to the steering mechanism; a torque sensor TS provided in the steering mechanism to detect steering torque of the steering mechanism; a power steering controller 4 outputting a command signal to the assist motor M in accordance with the steering torque; a vehicle speed signal receiving unit provided in the power steering controller 4 to receive a signal relating to a vehicle speed; an assist characteristic switching unit 41 (a steering characteristic storage circuit) provided in the power steering controller 4 to store a first characteristic (comfort mode) which is a characteristic of the command signal with respect to the steering torque, and a second characteristic (sports mode) which is a characteristic different from the first characteristic; an assist characteristic switching unit 41 (a steering characteristic switching control circuit) provided in the power steering controller 4 to switch to a characteristic selected from between the first characteristic and the second characteristic; an interpolation characteristic calculation unit provided in the power steering controller 4 to calculate, when switching between the first characteristic and the second characteristic is to be performed, an interpolation characteristic intermediate between the first characteristic and the second characteristic so that one of the first and second characteristics that is used before switching gradually approaches another of the first and second characteristics that is to be used after switching; a switching adjusting unit provided in the assist characteristic switching unit 41 to variably control a characteristic switching time for switching between the first characteristic and the second characteristic in accordance with the vehicle speed; and a command signal calculation circuit provided in a characteristic transition processing unit 42 to calculate the command signal on the basis of the characteristic to which switching has been made by the steering characteristic switching control circuit. Accordingly, the characteristic switching time is adjusted according to a vehicle speed reflecting frictional resistance against the road surface, which influences the steering torque. Thus, it is possible to suppress an incongruous steering sensation during switching of the characteristics.

(17) In the power steering apparatus as set forth in (16), when the steering characteristic switching control circuit switches from the first characteristic to the second characteristic while the vehicle speed is decreasing, the interpolation characteristic calculation unit calculates the interpolation characteristic so that the command signal will not decrease during a time period from start to completion of switching of the characteristics. Accordingly, even when the steering characteristic is switched from the first characteristic to the second characteristic, the assist torque of the electric motor is not decreased when the vehicle speed is decreasing such that the steering torque increases. Thus, it is possible to suppress the driver from feeling as if the steering wheel were forced back.

(18) In the power steering apparatus as set forth in (16), when the steering characteristic switching control circuit switches from the second characteristic to the first characteristic while the vehicle speed is decreasing, the switching adjusting unit sets the characteristic switching time longer than when the vehicle speed is kept constant. Accordingly, it is possible to suppress such an incongruous steering sensation that the steering load on the driver decreases suddenly or the steering load will not increase easily despite the fact that the vehicle speed is decreasing such that the steering torque increases. It should be noted that the present invention also includes an arrangement in which the steering load decreases in the above-described situation, provided that the extent to which the steering load decreases is suppressed.

(19) In the power steering apparatus as set forth in (16), when the steering characteristic switching control circuit switches from the second characteristic to the first characteristic while the vehicle speed is increasing, the interpolation characteristic calculation unit calculates the interpolation characteristic so that the command signal will not increase during a time period from start to completion of switching of the characteristics. Accordingly, even when the steering characteristics are switched from the second characteristic to the first characteristic, the assist torque of the electric motor is not increased when the vehicle speed is increasing such that the steering torque decreases. Thus, it is possible to suppress a feeling as if there were a sudden loss of steering load.

(20) In the power steering apparatus as set forth in (16), when the steering characteristic switching control circuit switches from the first characteristic to the second characteristic while the vehicle speed is increasing, the switching adjusting unit sets the characteristic switching time longer than when the vehicle speed is kept constant. Accordingly, it is possible to suppress such an incongruous steering sensation that the steering load on the driver increases suddenly or the steering load will not decrease easily despite the fact that the vehicle speed is increasing such that the steering torque decreases. It should be noted that the present invention also includes an arrangement in which the steering load increases in the above-described situation, provided that the extent to which the steering load increases is suppressed.

(21) In the power steering apparatus as set forth in (16), the switching adjusting unit sets the characteristic switching time shorter when the vehicle speed is less than a predetermined value than when the vehicle speed is not less than the predetermined value. Accordingly, when the vehicle speed is zero, the change in steering torque associated with the switching of the characteristics is also small; therefore, switching responsiveness can be improved by shortening the characteristic switching time. For example, when the driver manually switches the characteristics from one to another, it is possible to speedily respond to the driver's intention of switching the characteristics. It should be noted that the vehicle may be configured to automatically switch the characteristics.

According to the embodiments described above, the characteristic switching time is adjusted in accordance with the steering torque, which reflects a state of steering by the driver and a vehicle running state. Thus, it is possible to suppress the driver from feeling an incongruous steering sensation during switching of the characteristics.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Application No. 2013-196956 filed on Sep. 24, 2013. The entire disclosure of Japanese Patent Application No. 2013-196956 filed on Sep. 24, 2013 including specification, claims, drawings and summary is incorporated herein by reference in its entirety.

The entire disclosure of Japanese Patent Application Publication No. H11-29056 including specification, claims, drawings and summary is incorporated herein by reference in its entirety.

What is claimed is:

1. A power steering apparatus comprising:
   a steering mechanism transmitting a steering operation of a steering wheel to a steered wheel;
   an electric motor applying steering force to the steering mechanism;
   a torque sensor provided in the steering mechanism and detecting steering torque of the steering mechanism;
   a controller configured to
   calculate and output a command signal to the electric motor in accordance with the steering torque, in response to a selected one of a first characteristic which is a characteristic of the command signal with respect to the steering torque and a second characteristic which is a characteristic differing from the first characteristic;
   store the first characteristic and the second characteristic;
   switch between the first characteristic and the second characteristic;
   calculate, when switching between the first characteristic and the second characteristic is to be performed, an interpolation characteristic intermediate between the first characteristic and the second characteristic so that one of the first and second characteristics that is used before switching gradually approaches another of the first and second characteristics that is to be used after the switching;
   variably control a transition duration for transitioning from the one of the first characteristic and the second characteristic to the other when switching between the first characteristic and the second characteristic in accordance with the steering torque;
   calculate the command signal on a basis of the one of the first or second characteristic to which switching has been made, and
   calculate and output the command signal to the electric motor, based on the interpolation characteristic, during the transition duration,
   wherein the electric motor applies the steering force in response to the command signal received from the controller.

2. The power steering apparatus of claim 1, wherein the first characteristic is set larger than the second characteristic in terms of a value of the command signal with respect to the steering torque, and when the controller switches from the first characteristic to the second characteristic while the steering torque is decreasing, the controller sets the characteristic switching time longer than when the steering torque is kept constant.

3. The power steering apparatus of claim 2, wherein, when the controller switches from the first characteristic to the second characteristic while the steering torque is decreasing, the controller calculates the interpolation characteristic so that the steering torque will not increase during a time period from start to completion of switching of the characteristics.

4. The power steering apparatus of claim 3, wherein, when the controller switches from the first characteristic to the second characteristic while the steering torque is decreasing, the controller calculates the interpolation characteristic on a basis of the steering torque and the characteristic to be used after the switching.

5. The power steering apparatus of claim 1, wherein the first characteristic is set larger than the second characteristic in terms of a value of the command signal with respect to the steering torque, and when the controller switches from the second characteristic to the first characteristic while the steering torque is decreasing, the controller sets the characteristic switching time longer than when the steering torque is kept constant.

6. The power steering apparatus of claim 5, wherein, when the controller switches from the second characteristic to the first characteristic while the steering torque is decreasing, the controller calculates the interpolation characteristic so that the command signal will not increase during a time period from start to completion of switching of the characteristics.

7. The power steering apparatus of claim 6, wherein, when the controller switches from the second characteristic to the first characteristic while the steering torque is decreasing, the controller calculates the interpolation characteristic on a basis of the steering torque and the characteristic to be used after the switching.

8. The power steering apparatus of claim 1, wherein the first characteristic is set larger than the second characteristic in terms of a value of the command signal with respect to the steering torque, and when the controller switches from the second characteristic to the first characteristic while the steering torque is increasing, the controller sets the characteristic switching time longer than when the steering torque is kept constant.

9. The power steering apparatus of claim 8, wherein, when the controller switches from the second characteristic to the first characteristic while the steering torque is increasing, controller calculates the interpolation characteristic so that the steering torque will not decrease during a time period from start to completion of switching of the characteristics.

10. The power steering apparatus of claim 9, wherein, when the controller switches from the second characteristic to the first characteristic while the steering torque is increasing, the controller calculates the interpolation characteristic on a basis of the steering torque and the characteristic to be used after the switching.

11. The power steering apparatus of claim 1, wherein the first characteristic is set larger than the second characteristic in terms of a value of the command signal with respect to the steering torque, and when the controller switches from the first characteristic to the second characteristic while the steering torque is increasing, the controller sets the characteristic switching time longer than when the steering torque is kept constant.

12. The power steering apparatus of claim 11, wherein, when the controller switches from the first characteristic to the second characteristic while the steering torque is increasing, the controller calculates the interpolation characteristic so that the command signal will not decrease during a time period from start to completion of switching of the characteristics.

13. The power steering apparatus of claim 12, wherein, when the controller switches from the first characteristic to the second characteristic while the steering torque is increasing, the controller calculates the interpolation characteristic on a basis of the steering torque and the characteristic to be used after the switching.

14. The power steering apparatus of claim 1, wherein the controller sets the characteristic switching time longer as the steering torque increases.

15. The power steering apparatus of claim 1, wherein the controller sets the characteristic switching time shorter when the steering torque is less than a predetermined value than when the steering torque is not less than the predetermined value.

\* \* \* \* \*